(12) United States Patent
Calabró

(10) Patent No.: US 11,190,306 B2
(45) Date of Patent: Nov. 30, 2021

(54) PERFORMANCE MONITORING FOR A TRANSMISSION SYSTEM WITH FORWARD ERROR CORRECTION

(71) Applicant: Xieon Networks S.à.r.l., Luxembourg (LU)

(72) Inventor: Stefano Calabró, Munich (DE)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

(21) Appl. No.: 16/723,462

(22) Filed: Dec. 20, 2019

(65) Prior Publication Data

US 2020/0204307 A1 Jun. 25, 2020

(30) Foreign Application Priority Data

Dec. 21, 2018 (EP) ..................................... 18215654

(51) Int. Cl.
*H04L 1/20* (2006.01)
*H04B 10/079* (2013.01)
*H04L 1/00* (2006.01)

(52) U.S. Cl.
CPC ......... *H04L 1/203* (2013.01); *H04B 10/0795* (2013.01); *H04L 1/0003* (2013.01); *H04L 1/0009* (2013.01); *H04L 1/0047* (2013.01)

(58) Field of Classification Search
None
See application file for complete search history.

(56) References Cited

U.S. PATENT DOCUMENTS

| | | | | |
|---|---|---|---|---|
| 7,095,956 B2* | 8/2006 | Levandovsky | .... | H04Q 11/0062 398/25 |
| 2012/0287813 A1* | 11/2012 | Alm | ...................... | H04L 1/0009 370/252 |
| 2013/0297986 A1* | 11/2013 | Cohen | ................... | G06F 3/0676 714/763 |
| 2013/0310091 A1* | 11/2013 | Tabet | .................... | H04L 1/0003 455/501 |
| 2014/0325319 A1* | 10/2014 | Cai | ....................... | H04L 1/0054 714/774 |

* cited by examiner

*Primary Examiner* — Darren E Wolf

(57) ABSTRACT

A system for determining a channel margin of a data transmission channel (DTC) using error correction under real-world channel conditions is described. The system includes a monitoring unit, an operating state determining unit and a data processing unit. The monitoring unit monitors data transmission along the DTC and estimates a statistical distribution of errors (H) in the transmission of data. The operating state determining unit determines a current value of an operating state parameter for the DTC. The data processing unit determines a reference channel margin associated with said current value of the operating state parameter for a reference channel and the error correction scheme employed, provides a statistical distribution of errors (HR) associated with said reference channel for said current value of said operating state parameter, compute a deviation of H and HR, and computes a reduction of the reference channel margin.

37 Claims, 3 Drawing Sheets

PERFORMANCE MONITORING FOR A TRANSMISSION SYSTEM WITH FORWARD ERROR CORRECTION

INCORPORATION BY REFERENCE

The present patent application claims priority to European Patent Application 18215654.7 (filed Dec. 21, 2018), the entire content of which is hereby incorporated herein by reference.

FIELD OF THE INVENTION

The present invention is in the field of data transmission technology. More precisely, the present invention relates to a method of and system for determining a channel margin of a data transmission channel under real-world channel conditions.

BACKGROUND OF THE INVENTION

For many practical communication systems, it is essential to monitor the transmission quality and assess the system margin in order to maximize the transmitted information rate and minimize the operating costs. Whenever the actual system margin is deemed to exceed the required level, the information rate can be increased or the system can be switched into a mode with reduced performance and lower power consumption. On the contrary, when the system margin falls below a predetermined threshold, the information rate must be reduced or, possibly, a power-hungry mode with higher performance must be switched on. This dynamic reaction to the actual channel conditions, sometimes denoted link adaptation, is often implemented at the transponder level via adaptive coding and modulation (ACM) techniques.

Link adaptation has been used for many years in wireless communication and is included in numerous systems as WiMAX, WCDMA and LTE. Recently, with the advent of multi-format bandwidth-variable transponders (BVTs) and flexible-grid reconfigurable optical add-drop multiplexers (ROADMs), link adaptation has kindled a growing interest also in the field of fiber optic communications. Currently, several vendors announced or even commercialized optical BVTs that support modulations formats with finely configurable spectral efficiency, e.g. via hybrid quadrature amplitude modulation (HQAM) or probabilistic amplitude shaping (PAS).

The system margin is the distance between the current operating point and the operating point at which the data transmission fails, which is typically defined as the point at which the transmission error rate would exceed the maximum tolerable level. The operating point of data transmission failure is also referred to as the "threshold" herein. The margin can be measured in terms of any relevant parameter of the transmission system, generally referred to as the "operating state parameter" herein. The most common choice for such "operating state parameter" is the signal-to-noise ratio (SNR).

An accurate assessment of the system margin requires precise knowledge of the current operating point and of the threshold. In the presence of state-of-the art forward error correction (FEC) schemes, the threshold is typically a sharp function of the chosen operating state parameter, e.g. of the SNR or the channel (pre-FEC) bit error rate (BER). However, its exact position depends on the actual communication channel. For instance, systems with FEC are often designed and characterized for a channel subjected to additive white Gaussian noise (AWGN). If the actual channel is affected by other impairments than AWGN, the performance of the FEC may deteriorate and the threshold may deviate from its nominal value.

If the system threshold and the system margin cannot be evaluated exactly, link adaptation cannot attain its full potential. The uncertainty of threshold and system margin results, therefore, in a suboptimal system configuration. A straightforward solution is to assume that the nominal threshold corresponding to the reference channel is approximately valid also under practical channel conditions. To this end it is essential to select a reference channel that is representative of the typical real-world conditions. The drawbacks of this method are the poor accuracy and the large effort required to determine the reference channel and the corresponding system threshold before the deployment of the transmission system.

An alternative solution is to determine the threshold of the deployed system by stretching link adaptation up to the point of system break down. Since the channel conditions generally vary over time, the threshold must be periodically probed. This method has the obvious drawback of disturbing the transmission, which for some systems, including fiber optic transport systems, is not acceptable.

SUMMARY OF THE INVENTION

Accordingly, a problem underlying the invention is to provide a method of and a system for determining a channel margin of a data transmission channel using error correction under real-world channel conditions that allow for accurate channel margin estimation with moderate effort and without having to interrupt the data transmission on the channel. This problem is solved by a method of claim 1 and a system of claim 9.

A related problem underlying the invention is to provide a method and a system that allow for assessing deviations in the performance of the actual channel under real-world conditions from that of an idealized reference channel and providing corresponding notifications during operation of the channel. This problem is solved by a method of claim 8 and a system of claim 15. Preferable embodiments are defined in the dependent claims.

According to one aspect of the invention, a method of determining a channel margin of a data transmission channel using error correction under real-world channel conditions is provided. Herein, said channel margin resembles a distance of a current operating point from an operating point of data transmission failure, wherein said channel margin is measured in terms of at least one operating state parameter, for example the signal-to-noise ratio (SNR), although the method is not limited to this choice. The method comprises the following steps:

monitoring the data transmission along the transmission channel and estimating a statistical distribution H of errors in the transmission of data along said transmission channel, determining a current value of said at least one operating state parameter for the data transmission channel, determining a reference channel margin associated with said current value of said at least one operating state parameter for a reference channel and the error correction scheme employed, providing a statistical distribution $H_R$ of errors associated with said reference channel for said current value of said at least one operating state parameter, computing a deviation of said statistical distributions H and $H_R$, and computing a reduction of the reference channel margin associated with the at least one operating state parameter based on said deviation, wherein said channel margin of said transmission channel corresponds to the reference channel margin reduced by said reduction.

Note that the order in which the method steps are mentioned is not meant to imply a corresponding order of their execution. Instead, any technically sensible order is considered as an embodiment of this inventive method.

According to the present invention, the channel margin of the data transmission channel under real-world conditions is determined based on the channel margin of a reference channel, which can be regarded as an "idealized" or "design channel" for which the system margin is known (or easily obtainable) for the given error correction code and the given operating state parameter. More precisely, the channel margin of the real data transmission channel is determined as a correction of, and more precisely a reduction of the reference channel margin. The inventor has found that surprisingly, the performance deterioration of the error correction scheme under the real-world channel conditions can be evaluated by comparing the empirical statistical distribution H of errors in the transmission of data along said transmission with a reference distribution $H_R$ of errors associated with said reference channel for the current value of operating state parameter.

This approach is motivated by an information theory approach, which is essentially based on the concept of determining the amount of additional information required for achieving error free transmission under the real-world channel conditions as compared to the reference channel conditions. The deviation between the two probability distributions is used as a measure for the information loss suffered by the transmission system under the actual channel conditions, which can be compensated by a change in the operating state parameter, thereby leading to a reduction in the channel margin as compared to the reference channel margin.

Note that there are different ways in the art to compute a "deviation" of two statistical distributions. One possibility of such a "deviation" would be a so-called f-divergence, which measures the difference between two probability distributions, and that has the further properties of non-negativity, monotonicity, and joint convexity. A particularly useful f-divergence for use in the present invention is the so-called Kullback-Leibler divergence, which will be explained in more detail below. For reasons set forth along with the description of the preferred embodiment below, the Kullback-Leibler divergence is a particularly useful way of computing the "deviation" of the two statistical distributions for the purpose of the invention, as it allows for directly assessing a valid estimate for the information loss on the real-world channel, from which the reduction in the channel margin can be calculated in a closed form as demonstrated below. Nevertheless, the invention is not limited to these choices of "deviations", as other types of deviations will likewise allow for revealing differences between the real-world channel and the reference channel, that call for a correction of the reference channel margin, although in this case the deviation cannot necessarily be directly associated with information loss, and the corresponding reduction of the reference channel margin cannot necessarily be calculated in a closed form. Still, it is possible to establish empirical relationships between the observed deviation between the probability distributions and the corresponding reduction in channel margin, for example by fitting empirical data, by generating suitable models revealing the relationship between the deviation in the probability distributions and the reduction in channel margin, by establishing such a relationship by machine learning, or the like. Accordingly, even in cases where the information theory approach explained below is not followed exactly due to the use of other types of "deviations", it is still possible to compute a reduction of the reference channel margin associated with the at least one operating state parameter based on said deviation.

In this regard, it is to be further noted that the method of the invention relies on calculating a correction to the reference channel margin only, not the channel margin as such. In other words, even if the numerical value of the reduction to the reference channel margin is not entirely precise, the resulting channel margin of the real-world channel is still better than without such correction. Accordingly, the usefulness of the method is not compromised by approximations and simplifications made, as the resulting channel margin will still be much closer to the truth than the reference channel margin, and in many cases even give very reliable predictions.

Moreover, it is to be noted that the method of the invention can be carried out "on-the-fly", i.e. simultaneously with the data transmission on the transmission channel. It is not necessary to interrupt the data transmission at any time. It is further emphasized that errors in the transmitted data are corrected under the error correction scheme anyhow, and that it amounts to only minor additional effort to record the statistical distribution of these errors. Accordingly, the method of the invention does not require significant additional resources in the communication system.

In a preferred embodiment, the error correction used in the channel is a forward error correction (FEC). However, the invention is not limited to FEC. For example, in some variants, Automatic Repeat Request (ARQ) error control, or the so-called Hybrid Automatic Repeat Request ((H)ARQ) may be employed. In ARQ, acknowledgements and timeouts are used to establish reliable data transmission over an unreliable datalink. (H)ARQ is a combination of FEC and ARQ.

In a preferred embodiment, said reduction is a reduction factor or a subtrahend, that can be applied to the reference channel margin.

In a preferred embodiment, said operating state parameter is the signal to noise ratio (SNR), a pre-FEC BER, or a measure of mutual information between transmitted bits and received signal.

In a preferred embodiment, said reduction of the reference channel margin is a reduction in the net coding gain (NCG) due to the deviation of the real world channel conditions from the reference channel conditions.

In a preferred embodiment, said reference channel is a memoryless channel affected only by additive white Gaussian noise (AWGN). This is a particularly useful choice, since most forward error correction schemes are designed for this type of idealized communication channel, and their performance can be described in terms of simple parameters like the BER or NCG.

In a preferred embodiment, said errors in the error distribution are bit errors in bits transmitted along said transmission channel prior to error correction.

Preferably, said statistical distribution of errors is a distribution of the number of errors per code word of a given length L. This statistical distribution is particularly suitable, as it allows for revealing temporal correlation in the noise processes, which in most cases are understood to be the primary cause of NCG reduction. Note that such temporal correlation of the noise process will lead to error bursts, and hence higher probabilities of large numbers of errors per code word then would be expected in comparison to the case of a noise process without time correlation.

In preferred embodiments, the length L of the code word may be defined as 10,000≤L≤500,000, more preferably 50,000≤L≤200,000. In addition or alternatively, the length L may correspond to the length of the data blocks processed by the error correction code. This leads to a particularly easy way of generating the statistical distribution of errors per code word, since the errors are corrected anyhow, and the remaining task is to record the number of errors that had to be corrected in the given data block.

The distribution of number of errors per code word may be provided as a histogram.

In a preferred embodiment, the deviation represents an estimate of an information loss on the data transmission channel under real-world channel conditions as compared to the reference channel. In other words, the deviation is calculated in a way chosen such that its value can be at least approximately regarded as a measure of the information loss due to the difference of the real channel from the reference channel.

Preferably, the method further comprises a step of calculating, from said information loss, a corresponding penalty in terms of said operating state parameter using the inverse $C^{-1}$ of the channel capacity $C(x)$ function, wherein x resembles the operating state parameter and said channel capacity $C(x)$ is a function of the operating state parameter x. As the skilled person will appreciate, the "channel capacity" is the tight upper bound on the rate at which information can be reliably transmitted on a communication channel. Following the terms of the so-called noisy channel coding theorem, the "channel capacity" of a given channel is the highest information rate in units of information per unit time—that can be achieved with arbitrarily small error probability. In information theory, it is derived that the channel capacity corresponds to the maximum of the mutual information between the input and output of the channel. This channel capacity obviously depends on the operating state of the channel, such as the SNR. In the framework of the present invention, the opposite relationship is of interest, i.e. the loss of mutual information is assessed based on the deviation in the statistical distributions of the errors, and it is to be determined by how much the operating state parameter has to be changed to compensate this loss in information. This compensatory change of the operating state parameter can be regarded as the "penalty" of said operating state parameter corresponding to the information loss, and it can be obtained based on the inverse $C^{-1}$ of the channel capacity function $C(x)$.

In a preferred embodiment, calculating said penalty in terms of said operating state parameter comprises comparing $C^{-1}(MIT)$ and $C^{-1}(MIT+\Delta MI)$, wherein MIT is the mutual information between the input and output of the reference channel at a threshold at which the reference channel fails, and $\Delta MI$ resembles the estimate of the information loss on the data transmission channel under real-world channel conditions as compared to the reference channel.

In a preferred embodiment, said deviation of said statistical distributions H and HR is computed using a mathematical operation $D(H\|HR)$ which obeys the following criteria:

$D(H\|H_R) \geq 0$ for all statistical distributions H, $H_R$, and $D(H\|H_R)=0$ if and only if the statistical distributions H and $H_R$ are identical, or at least almost everywhere identical.

In a preferred embodiment, said deviation is represented by an f-divergence, and in particular a Kullback-Leibler divergence, or by a quantity derived from a Kullback-Leibler divergence. Herein, a "quantity derived from a Kullback-Leibler divergence" could for example be a function of the Kullback-Leibler divergence. Note that the Kullback-Leibler divergence is not a "distance metric" in the strict sense of the word, as it is not symmetric, i.e. $D(H\|H_R)$ is generally not equal to $D(H_R\|H)$, and since it does not satisfy the triangle inequality. Using the Kullback-Leibler divergence as the "deviation" between the statistical distributions H and $H_R$ is particularly advantageous, as it provides a particularly accurate estimator for the information loss on a real channel.

In a preferred embodiment, said method of determining the channel margin of the data transmission channel is carried out repeatedly during operation of the transmission channel, and adaptive coding and modulation techniques are employed to adapt the coding and modulation to the determined channel margin. This way, optimum use of the resources can be made at all times, while still avoiding system failure and minimizing or avoiding data loss altogether.

The embodiments summarized so far are directed to actually calculating the channel margin of a data transmission channel. However, in some applications, a full calculation of the channel margin may not be necessary, or at least not necessary at all times. For some applications, or at some times, it can be sufficient to assess deviations in the performance of the actual channel under real-world conditions from that of an idealized reference channel and providing corresponding notifications during operation of the channel.

Accordingly, according to a second aspect of the invention, a method is provided for detecting a decrease in net coding gain associated with an error correction code in a data transmission channel under real-world channel conditions, as compared to the net coding gain for a reference channel, wherein said net coding gain is, at least in part, dependent on at least one operating state parameter, said method comprising the following steps:

monitoring the data transmission along the transmission channel and generating a statistical distribution H of errors in the transmission of data along said transmission channel, determining a current value of at least one operating state parameter for the data transmission channel, providing a statistical distribution $H_R$ of errors associated with said reference channel for said current value of said at least one operating state parameter, computing a deviation of said statistical distributions H and $H_R$, wherein said deviation is indicative of a reduction in net coding gain as compared to the reference channel at the same operating state parameter, and providing a notification or an alarm in case said deviation of said statistical distributions H and $H_R$ increases above one or more predetermined thresholds.

According to this second aspect, it is again exploited that the deviation of the statistical distributions H and $H_R$ from each other are at least qualitatively related to the information loss on the real channel, and hence associated with a reduction in net coding gain. Note that the wording "indicative of reduction in net coding gain" does not require that the reduction in net coding gain can be calculated from the deviation in closed form, but only that there is a systematic relationship between the deviation and the net coding gain. Benchmarks or thresholds for the deviations of the statistical distributions H and $H_R$ can then be determined empirically, such that they allow for noticing operating states where noteworthy changes in net coding gain occur. A notification or alarm in case said deviation of said statistical distributions H and $H_R$ increases above one or more predetermined thresholds can for example trigger a recalculation of the real channel margin, or other cautionary measures.

Note that all of the features described in combination with the first aspect above may likewise individually or in combination be employed in the method of the second aspect.

A further aspect of the invention relates to a system for determining a channel margin of a data transmission channel using error correction under real-world channel conditions, wherein said channel margin resembles a distance of a current operating point from an operating point of data transmission failure, wherein said channel margin is measured in terms of at least one operating state parameter, said system comprising:

a monitoring unit for monitoring the data transmission along the transmission channel and estimating a statistical distribution H of errors in the transmission of data along said transmission channel, an operating state determining unit for determining a current value of said at least one operating state parameter for the data transmission channel, and one or more data processing units, comprising at least one processor, and configured for
  determining a reference channel margin associated with said current value of said at least one operating state parameter for a reference channel and the error correction scheme employed,
  providing a statistical distribution $H_R$ of errors associated with said reference channel for said current value of said at least one operating state parameter,
  computing a deviation of said statistical distributions H and $H_R$, and
  computing a reduction of the reference channel margin associated with the at least one operating state parameter based on said deviation, wherein said channel margin of said transmission channel corresponds to the reference channel margin reduced by said reduction.

In preferred embodiments, the system is configured for carrying out a method according to one of the embodiments described above.

In a preferred embodiment, the error correction used in the channel is a forward error correction (FEC). The reduction may be a reduction factor or a subtrahend.

In a preferred embodiment, said operating state parameter is a signal to noise ratio (SNR), a pre-FEC BER, or a measure of mutual information between transmitted bits and received signal.

In various embodiments, said reduction of the reference channel margin is a reduction in the net coding gain due to the deviation of the real world channel conditions from the reference channel conditions.

In preferred embodiments, said reference channel is a memoryless channel affected only by additive white Gaussian noise (AWGN).

In preferred embodiments, said errors in the error distribution are bit errors in bits transmitted along said transmission channel prior to error correction.

Said statistical distribution of errors is preferably a distribution of the number of errors per code word of a given length L, wherein preferably $10{,}000 \leq L \leq 500{,}000$, more preferably $50{,}000 \leq L \leq 200{,}000$, and/or wherein the length L corresponds to the length of the data blocks processed by the error correction code. Herein, said distribution of number of errors per code word may be provided as a histogram.

In a preferred embodiment, said deviation represents an estimate of an information loss on the data transmission channel under real-world channel conditions as compared to the reference channel.

In preferred embodiments, said one or more data processing units is or are further configured for calculating, from said information loss, a corresponding penalty in terms of said operating state parameter using the inverse C−1 of the channel capacity C(x), wherein x resembles the operating state parameter and said channel capacity C(x) is a function of the operating state parameter x. Herein, calculating said penalty in terms of said operating state parameter preferably comprises comparing C−1 (MIT) and C−1 (MIT+ΔMI), wherein MIT is the mutual information between the input and output of the reference channel at a threshold at which the reference channel fails, and ΔMI resembles the estimate of the information loss on the data transmission channel under real-world channel conditions as compared to the reference channel.

In a preferred embodiment, said one or more data processing units is or are configured for computing said deviation of said statistical distributions H and HR using a mathematical operation D(H∥HR) which obeys the following criteria
  $D(H\|H_R) \geq 0$ for all statistical distributions H, $H_R$, and
  $D(H\|H_R) = 0$ if and only if there statistical distributions H and $H_R$ are identical, or at least almost everywhere identical.

In a preferred embodiment, said deviation is represented by a Kullback-Leibler divergence, or by a quantity derived from a Kullback-Leibler divergence.

In a preferred embodiment, said system is configured for determining the channel margin of the data transmission channel repeatedly during operation of the transmission channel, and for employing adaptive coding and modulation techniques to adapt the coding and modulation to the determined channel margin.

In preferred embodiments, said transmission channel is an optical channel, in particular an optical transport channel.

According to a yet further aspect of the invention, a system for detecting a decrease in net coding gain associated with an error correction code in a data transmission channel under real-world channel conditions, as compared to the net coding gain for a reference channel, is provided. Herein, said net coding gain is, at least in part, dependent on at least one operating state parameter. Said system comprises a monitoring unit for monitoring the data transmission along the transmission channel and generating a statistical distribution H of errors in the transmission of data along said transmission channel, an operating state determining unit for determining a current value of at least one operating state parameter for the data transmission channel, and one or more data processing units, comprising at least one processor, and configured for
  providing a statistical distribution $H_R$ of errors associated with said reference channel for said current value of said at least one operating state parameter,
  computing a deviation of said statistical distributions H and $H_R$, wherein said deviation is indicative of a reduction in net coding gain as compared to the reference channel at the same operating state parameter, providing a notification or an alarm in case said deviation of said statistical distributions H and $H_R$ increases above one or more predetermined thresholds.

DESCRIPTION OF A PREFERRED EMBODIMENT

Figure 1:
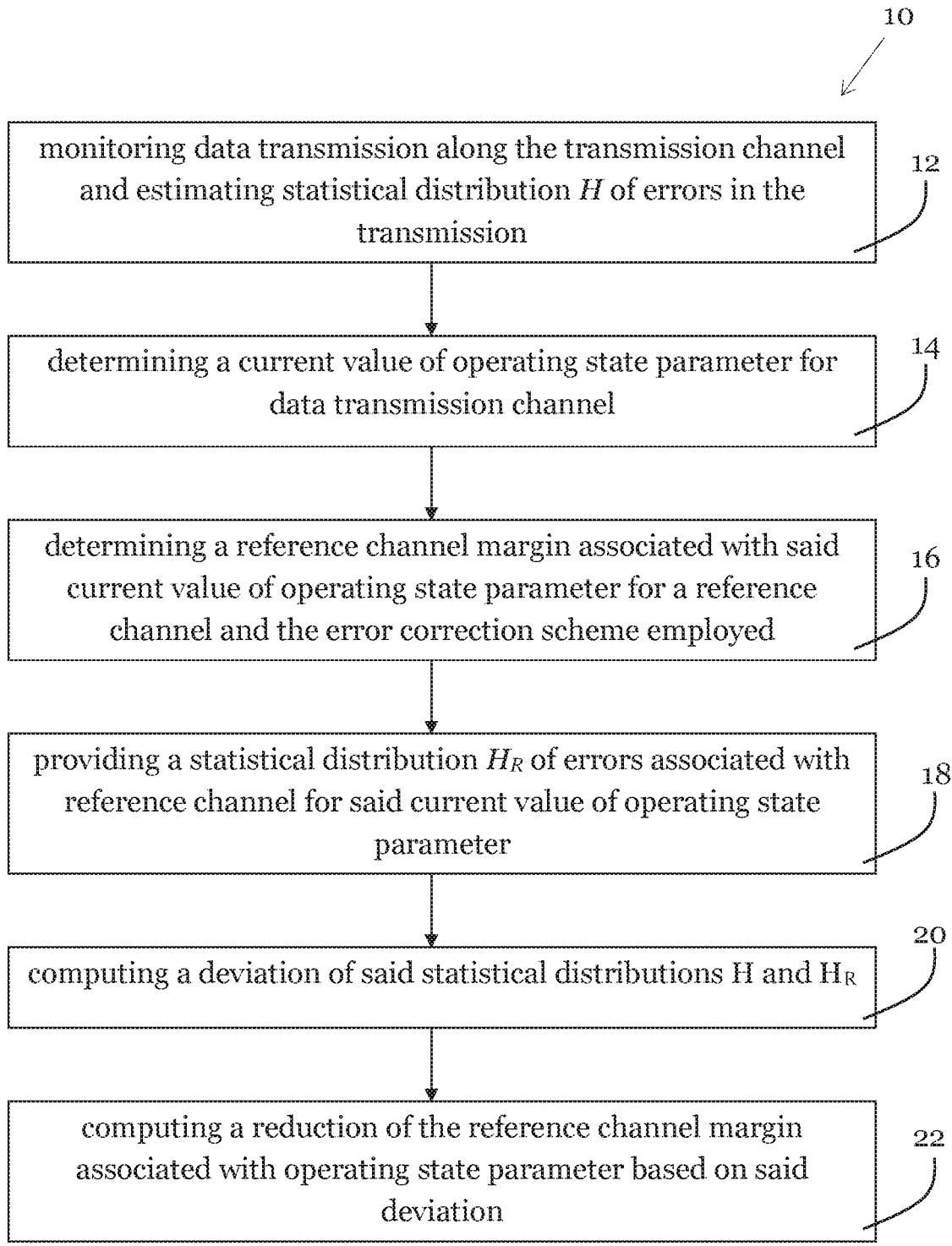
FIG. 1 is a flow diagram illustrating a method according to an embodiment of the invention.

FIG. 1 shows a flow diagram 10 illustrating a method of determining a channel margin of a data transmission channel according to an embodiment of the invention. Herein, the channel margin resembles a distance of a current operating point from an operating point of data transmission failure, and the channel margin is measured in terms of at least one operating state parameter, for example the signal-to-noise ratio (SNR).

In step 12, the data transmission along the transmission channel is monitored, and a statistical distribution H of errors in the transmission of data along said transmission channel is estimated. In step 14, a current value of said at least one operating state parameter for the data transmission channel, such as the SNR, is determined In step 16, a reference channel margin associated with said current value of said at least one operating state parameter for a reference channel and the error correction scheme employed is determined. Moreover, in step 18, a statistical distribution $H_R$ of errors associated with said reference channel for said current value of said at least one operating state parameter is provided. Note that the order in which steps 12 to 18 are carried out need not be the same as the order in which they are recited in the flow diagram 10. Instead, the order could be changed, and some or all of the steps could be carried out at least partially simultaneously.

In step 20, a deviation of said statistical distributions H and HR is computed, and in step 22, a reduction of the reference channel margin associated with the at least one operating state parameter is computed based on said deviation. Herein, the channel margin of said transmission channel corresponds to the reference channel margin reduced by said reduction.

In a preferred embodiment of the invention, the channel margin of a data transmission channel under real-world channel conditions is calculated from a reference channel margin associated with a reference channel that is a memoryless channel affected only by AWGN.

For this reference channel, the BER threshold and the net coding gain (NCG) of a FEC code are assumed to be known. Herein, the "coding gain" is a measure of the difference between the signal-to-noise ratio levels between the uncoded system and the coded system required to reach the same BER levels when used with the FEC code. Note that the assumption of the reference channel as a memoryless channel affected only by AWGN is in line for example with the NCG definition in the ITU-T recommendation G.975.1 (February 2004) which assumes a binary-input AWGN (BI-AWGN) channel with input alphabet $\{-1; 1\}$ and a real continuous output alphabet.

On a real channel, in the presence of real-world channel conditions, including memory or additional impairments other than AWGN, a deterioration of the FEC threshold can occur which is often referred to as NCG reduction.

In this embodiment, a simple estimate of the NCG reduction based on the empirical distribution of the pre-FEC bit errors employed. For this purpose, we consider a histogram of the number of pre-FEC bit errors per code word. In particular, we define H(k) to be the empirical frequency of code words containing exactly k pre-FEC bit errors.

It is to be understood that this histogram does not reflect the complete nature of the noise under the real-world channel conditions, and this histogram can for example not be expected to be a good indicator of the Gaussianity of the noise. However, this is actually not critical for the performance of the embodiment, since state-of-the-art soft-decision FEC schemes are very tolerant to moderate deviations of the noise from the normal distribution. For example, it is well known that density evolution under the Gaussian approximation yields excellent results even if the log-likelihood ratios (LLRs) at the various decoding stages are not normally distributed. This topic has been discussed e.g. in S-Y. Chung, T. J. Richardson and R. L. Urbanke, "Analysis of sum-product decoding of low-density parity-check codes using a Gaussian approximation", IEEE Transactions on Information Theory, volume 47, number 2, on pages 657-670, February 2001.

On the other hand, the error histogram is particularly suitable for revealing the temporal correlation of the noise process, which is in most cases found to be the primary cause of NCG reduction.

In case of independent bit error events, as will be found on the reference channel under the influence of AWGN, the number of pre-FEC bit errors per code word follows the binomial distribution $$B_L(k) = \binom{L}{k} p^k (1-p)^{L-k} (k = 0, 1, \ldots, L), \tag{1}$$

where $B_L(k)$ is the probability that the considered code word contains exactly k pre-FEC bit errors, p is pre-FEC bit error probability, and L is the number of bits per code word. Note that $B_L(k)$ is an example of the statistical distribution $H_R$ of errors associated with said reference channel as referred to in the summary of the invention. As also mentioned in the summary of the invention, in the preferred embodiment, it is measured how the actual channel diverges from the reference BI-AWGN channel by means of the Kullback-Leibler (KL) divergence, which was introduced by S. Kullback and R. A. Leibler in their article "On information and sufficiency", Annals of Mathematical Statistics, pages 79-86 (1951).

In particular, since in this approach the focus of consideration is on the error correlation, i.e. the occurrence of error bursts, in this embodiment the KL divergence from the binomial distribution $B_L(k)$ to the observed histogram H(k) of the bit errors per code word is employed, which is defined as $$D_{KL}(H \vee B_L) = -\sum_{k=0}^{L} H(k) \log_2 \left( \frac{B_L(k)}{H(k)} \right), \tag{2}$$

with the convention that $$H(k) = 0 \Rightarrow H(k)\log_2\left(\frac{B_L(k)}{H(k)}\right) = 0. \tag{3}$$

Note that in the KL divergence, the further conditions holds:

$$D_{KL}(H \lor B_L) \geq 0 \tag{4}$$

and $$D_{KL}(H \lor B_L) = 0 \Leftrightarrow H = B_L. \tag{5}$$

Although the ultimate goal of this embodiment is to provide a quantitative estimation of the NCG reduction, it is worth mentioning that in various embodiments, the KL divergence can also be used to define a NCG reduction alarm during system operation. To this end it suffices to compare $D_{KL}$ (H$\lor$B$_L$) with a (set of) predefined threshold(s), as has been described with reference to the second aspect of the invention above.

Based on the KL divergence, an estimator of the NCG reduction of the real-world channel as compared to the reference channel can be determined, in a manner that will be described next. For deriving such estimator, the terminology of information theory is used, and the estimator is determined with reference to the amount of additional information required for achieving error-free transmission as compared with the reference channel. This approach leads to an estimator that has a number of very attractive properties: It is agnostic with respect to the FEC code, it holds for a general class of communication channels, it relies only on the knowledge of the error histogram, and it is comparatively simple to compute while at the same time being reasonably accurate.

According to the usual understanding, the task of a FEC decoder is to recover the transmitted word from the received word using the knowledge of code and channel. However, looked at this from a different perspective, it can be observed that this is equivalent to estimating the noise realization from the received word using this same knowledge. Herein, the "a noise realization" is understood as the actual noise on the transmitted signal for every bit or symbol, or in other words, the difference between the noisy signal that is actually transmitted, as compared to the signal that would be expected in absence of noise and that is actually recovered by error correction.

It assumed that the FEC threshold for the reference channel is defined as the maximum pre-FEC BER corresponding to virtually error-free transmission on the BI-AWGN reference channel. However, the FEC threshold can be expressed equivalently as the minimum mutual information (MI) between input and output of the BI-AWGN channel, which is required to achieve virtually error-free transmission. The MI threshold $MI_T$ hence represents the amount of information needed by the FEC decoder to estimate the noise realization (and, thus, the transmit data).

Let us denote by $$pdf_{AWGN}(n) = N\left(n; 0, \frac{N_0}{2}\right) \tag{6}$$

the probability density function (pdf) of the noise on the BI-AWGN channel, where $N(n; m, \sigma^2)$ is the normal distribution with expectation m and variance $\sigma^2$.

If we consider the L-fold channel used for the transmission of a whole code-word of length L, the corresponding L-dimensional pdf is $$pdf_{AWGN}^{(L)}(n) = N\left(n; 0, \frac{N_0}{2}I_L\right) \tag{7}$$

where $I_L$ is the identity matrix of size L, and n and 0 are vectors of size L, wherein n resembles the aforementioned "noise realisation".

Let us further denote by $pdf_{Ch}^{(L)}(n)$ the actual pdf of the L-fold channel, i.e. under real-world channel conditions. The KL divergence $D_{KL}$ ($pdf_{Ch}^{(L)}(n) \lor pdf_{AWGN}^{(L)}(n)$) measures how many additional information bits per word are needed to describe a noise realization that is drawn from the actual density function $pdf_{Ch}^{(L)}(n)$ instead of from the reference density function $pdf_{AWFN}^{(L)}(n)$.

Since the task of the decoder is to estimate the noise realization, one may interpret this KL divergence as the additional information that must be provided to the decoder for virtual error-free transmission on top of the amount of information $MI_T$ required on the reference BI-AWGN channel. The normalized additional number of bits per use of the scalar channel will be $$\Delta_{MI} = \frac{1}{L}D_{KL}(pdf_{Ch}^{(L)}(n) \lor pdf_{AWGN}^{(L)}(n)). \tag{8}$$

As mentioned above, in this approach the focus is only on the error correlation as the main source of deviation of the channel margin of the true channel as compared to the reference channel margin. Accordingly, it is possible to approximate the KL divergence of the L-dimensional pdfs by the KL divergence to the one-dimensional error histogram from the binomial distribution:

$$\Delta_{MI} \approx D_{KL}(H \lor B_L). \tag{9}$$

It is therefore seen that $D_{KL}$ (H$\lor$B$_L$) forms an estimator of the information loss on a real channel.

This information loss can then be translated in a penalty in terms of the SNR, i.e. a NCG reduction. To this end, one can compute the SNR increase required to enhance the MI by exactly the amount of information that is lost due to the divergence from the binomial error distribution.

Let us define the monotonic function $$C_{BIAWGN}\left(\frac{E_S}{N_0}\right), \tag{10}$$

which expresses the channel capacity of the BI-AWGN channel as a function of the SNR $$\frac{E_S}{N_0},$$

where $E_s$ is the energy per symbol and $N_0$ is the power spectral density (PSD) of the complex baseband AWGN. As the skilled person will appreciate, the "channel capacity" is the tight upper bound on the rate at which information can be reliably transmitted on a communication channel. Following the terms of the so-called noisy channel coding theorem, the "channel capacity" of a given channel is the highest information rate—in units of information per unit time—that can be achieved with arbitrarily small error probability. In information theory, it is derived that the channel capacity corresponds to the maximum of the mutual information between the input and output of the channel. Note that for a discrete channel, such as for digital transmission, one would in practice typically measure the MRI in units of information per channel use rather than per unit time.

The SNR threshold on the BI-AWGN reference channel can be computed from the inverse of the channel capacity function, i.e. as $$\left.\frac{E_S}{N_0}\right|_T = C_{BIAWGN}^{-1}(MI_T), \tag{11}$$

whereas the SNR threshold on the actual channel is $$\left.\frac{E_S}{N_0}\right|_{ch} = C_{BIAWGN}^{-1}(MI_T + D_{KL}(H \vee B_L)), \tag{12}$$

where we account for the information loss due to real-world conditions.

Finally, the NCG reduction $\Delta_{NCG}$ is approximated by the ratio between $$\left.\frac{E_S}{N_0}\right|_{ch} \text{ and } \left.\frac{E_S}{N_0}\right|_T:$$

$$\Delta_{NCG} = \frac{C_{BIAWGN}^{-1}(MI_T + D_{KL}(H \vee B_L))}{C_{BIAWGN}^{-1}(MI_T)}. \tag{13}$$

Figure 2:
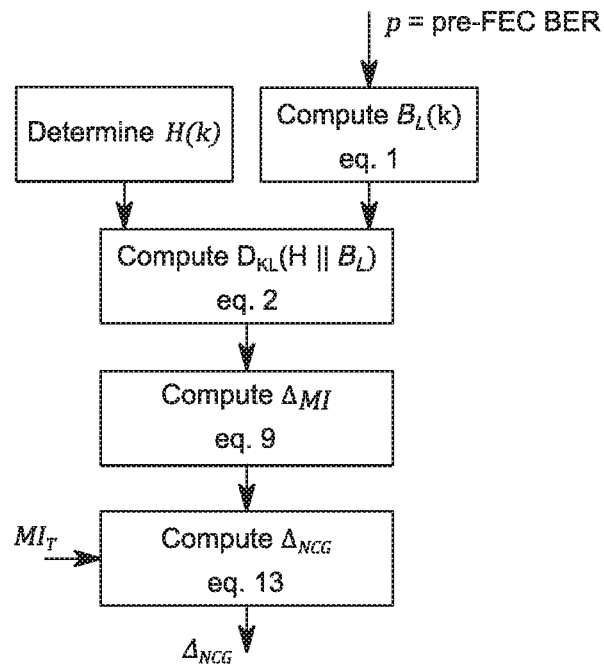
FIG. 2 is a diagram summarizing the computational flow of a method according to an embodiment of the invention.

Herein, $\Delta_{NCG}$ resembles the "NCG reduction estimator" referred to above. FIG. 2 summarizes the complete computational flow of the described embodiment for calculating the NCG reduction estimator.

In practical implementations of this embodiment, the code word length L can be between 10,000 and 500,000, and in particular between 50,000 and 250,000, which are realistic code word lengths in optical communication systems. For low-latency systems, shorter codewords are used. The invention can also be used for convolutional codes which have infinite codewords. This case, one may choose L at some arbitrary frame length. Numeric calculation of the binomial distribution for large values of the code word length L is difficult due to the occurrence of factorials of large numbers. In practice, it is therefore convenient to make use of the normal approximation $$B_L(k) \approx N(k; L \cdot p, L \cdot p \cdot (1-p))(k=0,1,\ldots,L), \tag{14}$$

where the pre-FEC bit error probability can be estimated by $$p \cong \sum_{k=0}^{L} \frac{k}{L} H(k). \tag{15}$$

Moreover, the performance of a FEC code is often known in terms of the pre-FEC BER threshold rather than the MI threshold. However, the skilled person will appreciate that MI threshold $MI_T$ can be obtained from the BER threshold $BER_T$ of the FEC code. For example, it will be appreciated that the pre-FEC BER on the BI-AWGN channel depends on the SNR as $$BER = \frac{1}{2} erfc\left(\sqrt{\frac{E_S}{N_0}}\right), \tag{16}$$

which, together with equation (10, leads to $$MI_T = C_{BIAWGN}(erfc^{-1}(2 \cdot BER_T)). \tag{17}$$

Finally, in some embodiments, the histogram H(k) may be generalized to represent the empirical frequency of code words containing a number pre-FEC bit errors between k·W+1 and (k+1)·W. The derivation above, which is valid for W=1, can be immediately extended to the case of a generic bin width W. The use of a bin size W>1 can potentially lead to a lower computational burden.

Figure 3:
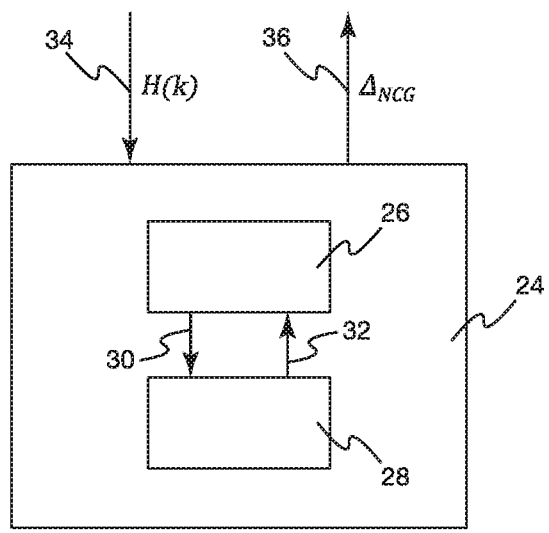
FIG. 3 is a schematic diagram illustrating a system according to an embodiment of the invention.

FIG. 3 schematically shows a system 24 for determining a channel margin of a data transmission channel. The system comprises a computation unit, such as a microprocessor 26, and a memory 28. The microprocessor 26 and the memory 28 are connected by a data connection lines 30, 32 for bidirectional transfer of data. Via a data connection 34, the system 24 is configured to obtain a statistical distribution H of errors in the transmission that can be provided by the FEC decoder (not shown) at the receiving unit of the channel. Moreover, the system 24 may receive, via the same data connection 34, information regarding the current value of the operating state parameter for the data transmission channel, such as the current SNR. The microprocessor 26 is programmed to determine, based on the current value of the operating state parameter and knowledge about the reference channel and error correction scheme employed, a reference channel margin associated with the reference channel. Information about the reference channel and error correction scheme employed therein may be retrieved from the memory 28. The microprocessor 26 is further programmed to provide a statistical distribution $H_R$ of errors associated with said reference channel, which in various embodiments will simply amount to the binomial distribution $B_L(k)$ given in equation (i). The processor 26 is further configured to compute a deviation of the statistical distributions H and $H_R$, such as the KL divergence $D_{KL}(H \backslash\backslash H)$ defined in equation (2), and to calculate a NCG reduction $\Delta_{NCG}$ therefrom in a manner described above. The system 24 is further configured to output the NCG reduction on a data connection 36 e.g. to the network management system which may initiate appropriate link adaption operations, for example by employing elective coding and modulation techniques at the transponder level.

Figure 4:
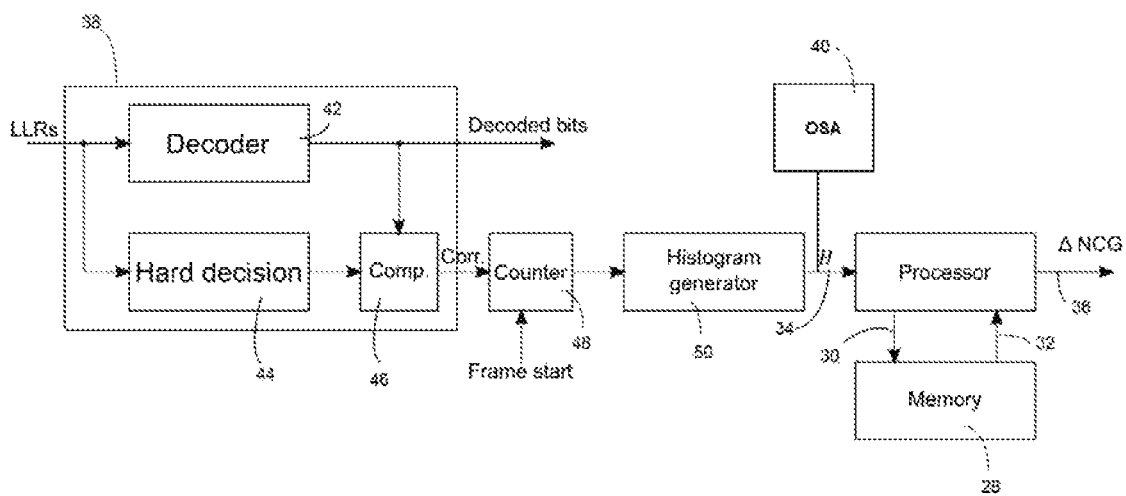
FIG. 4 shows a system similar to that of FIG. 3 in combination with an FEC decoder that is capable of soft decoding and an optical spectrum analyzer (OSA) for determining a SNR serving as an operating state parameter.

FIG. 4 shows a system 24 corresponding to that of FIG. 3 in combination with a FEC decoder 38 that is capable of soft decoding, and with an optical spectrum analyzer (OSA) 40. The FEC decoder 38 comprises a decoder 42, a hard decision device 44 and a comparison device 46. The FEC decoder 38 receives log-likelihood ratios (LLRs) carrying so-called "a priori probabilities" of each bit being zero or one. The FEC decoder 38 provides, in addition to the decoded bits, information about the applied corrections, for example the position and/or or number of the corrections. In case of successful decoding, the applied corrections correspond to the channel errors. A counter 48 is provided for counting the number of bit errors occurring within a code word or frame of a given length. As shown in FIG. 4, the counter may receive a frame start signal triggering the counter 48 to start counting. Downstream of the counter 48, a histogram generator 50 is provided, which generates a histogram representing the aforementioned statistical distribution of errors. The FEC decoder 38, the counter 48 and the histogram generator 50 can e.g. be embodied in dedicated hardware, or in software using a digital signal processor under appropriate programming. In preferred embodiments, the FEC decoder 38, the counter 48 and the histogram generator 50 are implemented in ASIC logic. Note that the FEC decoder 38, in combination with the counter 48 and histogram generator 50, resembles one embodiment of the aforementioned "monitoring unit" for monitoring the data transmission along a transmission channel and estimating a statistical distribution H of errors in the transmission of data along said transmission channel.

The OSA 40 allows for measuring the optical signal-to-noise ratio, which is an example of the "operating state parameter" used in the present invention for determining a channel margin. Accordingly, the OSA 40 resembles an exemplary embodiment of the "operating state determining unit".

In the specific embodiment described above, the "deviation" of the two statistical distributions H and $H_R$ is calculated as the Kullback-Leibler divergence. This is a particularly useful way of computing the "deviation" of the two statistical distributions for the purpose of the invention, as it allows for directly assessing a valid estimate for the information loss on the real-world channel, from which the reduction in the channel margin can be calculated in a closed form as demonstrated above. Nevertheless, as was emphasized in the summary of the invention, the invention is not limited to this choice of "deviation". Instead, other types of deviations likewise allow for revealing differences between the real-world channel and the reference channel, that call for a correction of the reference channel margin. In this case, while the elegant derivation based on information theory presented above does not necessarily apply in full, it is nevertheless possible to establish empirical relationships between the observed deviation between the probability distributions and the corresponding reduction in channel margin. Such empirical relationships can e.g. be established by fitting empirical data and/or by generating suitable models revealing the relationship between the deviation in the probability distributions and the reduction in channel margin. This is possible, because the true system margin can e.g. be determined by stretching link adaptation up to the point of system break down. While this is not an attractive option during operation, as it interrupts the transmission of data, for establishing the relationship between the deviation in error distributions and corresponding reduction in channel margin for future use, this is tolerable. Moreover, as was proposed in the summary of the invention, such a relationship can likewise be established by machine learning. So in summary, even in cases where the information theory approach explained above is not followed exactly due to the use of other types of "deviations", it is still possible to compute a reduction of the reference channel margin associated with the at least one operating state parameter based on said deviation.

In this regard, it is again emphasized that the method of the invention relies on calculating a correction to the reference channel margin only, not the channel margin as such. This implies that the numerical value of the reduction to the reference channel margin need not necessarily be entirely precise in order to provide a useful improvement over existing methods, as the resulting channel margin of the real-world channel is still better than without such correction. Accordingly, the usefulness of the method is not compromised by approximations and simplifications made, including the use of other ways of calculating the deviation between the error distributions than the Kullback-Leibler divergence.

As is further apparent from the above description, the method of the invention can be carried out simultaneously with the data transmission on the transmission channel, without interrupting or even slowing down the data transmission. Moreover, it is easily appreciated that no extra effort is required in obtaining the error distributions in the transmission since the errors in the transmitted data are corrected under the error correction scheme anyhow, and only have to be kept track of in a histogram or the like. Accordingly, the method of the invention can be very easily implemented in existing communication systems with only very moderate modifications thereof.

What is claimed is:

1. A method of determining a channel margin of a data transmission channel using an error correction under real-world channel conditions, wherein the channel margin corresponds to a distance of a current operating point from an operating point of a data transmission failure, wherein the channel margin is measured in terms of at least one operating state parameter, the method comprising:
  monitoring a data transmission along the data transmission channel and estimating a statistical distribution H of errors in the data transmission along the data transmission channel,
  determining a current value of the at least one operating state parameter for the data transmission channel,
  determining a reference channel margin associated with the current value of the at least one operating state parameter for a reference channel and an employed error correction scheme,
  providing a statistical distribution $H_R$ of errors associated with the reference channel for the current value of the at least one operating state parameter,
  computing a deviation of the statistical distributions H and $H_R$, and
  computing a reduction of the reference channel margin associated with the at least one operating state parameter based on the deviation, wherein the channel margin of the data transmission channel corresponds to the reference channel margin reduced by the reduction.

2. The method of claim 1, wherein the error correction used in the data transmission channel comprises a forward error correction (FEC).

3. The method of claim 1, wherein the reduction of the reference channel margin comprises one of:
  a reduction factor,
  a subtrahend.

4. The method of claim 1, wherein the operating state parameter comprises at least one of:
  a signal to noise ratio (SNR),
  a pre-FEC bit error rate (BER),
  a measure of mutual information between transmitted bits and a received signal.

5. The method of claim 1, wherein the reduction of the reference channel margin comprises a reduction in a net coding gain due to a deviation of the real-world channel conditions from reference channel conditions.

6. The method of claim 1, wherein the reference channel comprises a memoryless channel affected only by additive white Gaussian noise (AWGN).

7. The method of claim 1, wherein the errors in the statistical distribution $H_R$ of errors are bit errors in bits transmitted along the data transmission channel prior to error correction.

8. The method of claim 1, wherein the statistical distribution $H_R$ of errors comprises a distribution of a number of errors per code word of a given length L, wherein at least one of:

$10{,}000 \leq L \leq 500{,}000$, the length L corresponds to the length of data blocks processed by the error correction code.

9. The method of claim 8, wherein the distribution of the number of errors per code word is provided as a histogram.

10. The method of claim 1, wherein the deviation represents an estimate of an information loss on the data transmission channel under real-world channel conditions as compared to the reference channel.

11. The method of claim 10, wherein the method further comprises a step of calculating, from the information loss, a corresponding penalty in terms of the operating state parameter using the inverse $C^{-1}$ of a channel capacity $C(x)$, wherein x corresponds to the operating state parameter and the channel capacity $C(x)$ is a function of the operating state parameter x.

12. The method of claim 11, wherein calculating the penalty in terms of the operating state parameter comprises comparing $C^{-1}$ ($MI_T$) and $C^{-1}$ ($MI_T + \Delta_{MI}$), wherein $MI_T$ comprises mutual information between an input and an output of the reference channel at a threshold at which the reference channel fails, and $\Delta_{MI}$ corresponds to the estimate of the information loss on the data transmission channel under real-world channel conditions as compared to the reference channel.

13. The method of claim 1, wherein the deviation of the statistical distributions H and $H_R$ is computed using a mathematical operation $D(H\|H_R)$ which obeys the following criteria:

$D(H\|H_R)=0$ at least in a first circumstance in which the statistical distributions H and $H_R$ are identical; and $D(H\|H_R) \geq 0$ at least in each of at least one other circumstance in which the statistical distributions H and $H_R$ are not identical.

14. The method of claim 1, wherein the deviation is represented by at least one of:

a Kullback-Leibler divergence, a quantity derived from a Kullback-Leibler divergence.

15. The method of claim 1, wherein the method of determining the channel margin of the data transmission channel is carried out repeatedly during operation of the data transmission channel, and wherein adaptive coding and modulation techniques are employed to adapt to the determined channel margin.

16. The method of claim 1, wherein the data transmission channel comprises an optical transport channel.

17. A method of detecting a decrease in net coding gain associated with an error correction code in a data transmission channel under real-world channel conditions, as compared to the net coding gain for a reference channel, wherein the net coding gain is, at least in part, dependent on at least one operating state parameter, the method comprising:

monitoring a data transmission along the data transmission channel and generating a statistical distribution H of errors in the data transmission along the transmission channel, determining a current value of at least one operating state parameter for the data transmission channel, providing a statistical distribution $H_R$ of errors associated with the reference channel for the current value of the at least one operating state parameter, computing a deviation of the statistical distributions H and $H_R$, wherein the deviation is indicative of a reduction in net coding gain as compared to the reference channel at the same operating state parameter, providing at least one of the following if the deviation of the statistical distributions H and $H_R$ increases above at least one predetermined threshold:

an alarm, a notification.

18. A system for determining a channel margin of a data transmission channel using an error correction under real-world channel conditions, wherein the channel margin corresponds to a distance of a current operating point from an operating point of a data transmission failure, wherein the channel margin is measured in terms of at least one operating state parameter, the system comprising:

a monitoring unit for monitoring a data transmission along the data transmission channel and estimating a statistical distribution H of errors in the data transmission along the transmission channel, an operating state determining unit for determining a current value of the at least one operating state parameter for the data transmission channel, and at least one data processing unit, comprising at least one processor, and configured for:

determining a reference channel margin associated with the current value of the at least one operating state parameter for a reference channel and an employed error correction scheme, providing a statistical distribution $H_R$ of errors associated with the reference channel for the current value of the at least one operating state parameter, computing a deviation of the statistical distributions H and $H_R$, and computing a reduction of the reference channel margin associated with the at least one operating state parameter based on the deviation, wherein the channel margin of the data transmission channel corresponds to the reference channel margin reduced by the reduction.

19. The system of claim 18, wherein the error correction used in the data transmission channel comprises a forward error correction (FEC).

20. The system of claim 18, wherein the reduction comprises one of:

a reduction factor, a subtrahend.

21. The system of claim 18, wherein the operating state parameter comprises at least one of:

a signal to noise ratio (SNR), a pre-FEC bit error rate (BER), a measure of mutual information between transmitted bits and a received signal.

22. The system of claim 18, wherein the reduction of the reference channel margin comprises a reduction in a net coding gain due to a deviation of the real-world channel conditions from reference channel conditions.

23. The system of claim 18, wherein the reference channel comprises a memoryless channel affected only by additive white Gaussian noise (AWGN).

24. The system of claim 18, wherein the errors in the statistical distribution $H_R$ of errors are bit errors in bits transmitted along the data transmission channel prior to error correction.

25. The system of claim 18, wherein the statistical distribution $H_R$ of errors comprises a distribution of a number of errors per code word of a given length L, wherein at least one of:

$$10{,}000 \leq L \leq 500{,}000,$$

the length L corresponds to the length of data blocks processed by the error correction code.

26. The system of claim 25, wherein the distribution of number of errors per code word is provided as a histogram.

27. The system of claim 18, wherein the deviation represents an estimate of an information loss on the data transmission channel under real-world channel conditions as compared to the reference channel.

28. The system of claim 27, wherein the at least one data processing unit is further configured for calculating, from the information loss, a corresponding penalty in terms of the operating state parameter using the inverse $C^{-1}$ of a channel capacity $C(x)$, wherein x corresponds to the operating state parameter and the channel capacity $C(x)$ is a function of the operating state parameter x [·].

29. The system of claim 28, wherein calculating the penalty in terms of the operating state parameter comprises comparing $C^{-1}(MI_T)$ and $C^{-1}(MI_T + \Delta_{MI})$, wherein $MI_T$ comprises mutual information between an input and an output of the reference channel at a threshold at which the reference channel fails, and $\Delta_{MI}$ corresponds to the estimate of the information loss on the data transmission channel under real-world channel conditions as compared to the reference channel.

30. The system of claim 18, wherein the at least one data processing unit is configured for computing the deviation of the statistical distributions H and $H_R$ using a mathematical operation $D(H\|H_R)$ which obeys the following criteria:

$D(H\|H_R)=0$ at least in a first circumstance in which the statistical distributions H and $H_R$ are identical; and $D(H\|H_R)\geq 0$ at least in each of at least one other circumstance in which the statistical distributions H and $H_R$ are not identical.

31. The system of claim 18, wherein the deviation is represented by at least one of:

a Kullback-Leibler divergence, a quantity derived from a Kullback-Leibler divergence.

32. The system of claim 18, wherein the system is configured for determining the channel margin of the data transmission channel repeatedly during operation of the data transmission channel, and for employing adaptive coding and modulation techniques to adapt to the determined channel margin.

33. The system of claim 18, wherein the data transmission channel comprises an optical transport channel.

34. The method of claim 1, wherein the deviation of the statistical distributions H and $H_R$ is computed using a mathematical operation $D(H\|H_R)$ which obeys the following criteria:

$D(H\|H_R)=0$ if and only if the statistical distributions H and $H_R$ are identical; and $D(H\|H_R)\geq 0$ for all other statistical distributions H, $H_R$.

35. The system of claim 18, wherein the at least one data processing unit is configured for computing the deviation of the statistical distributions H and $H_R$ using a mathematical operation $D(H\|H_R)$ which obeys the following criteria:

$D(H\|H_R)=0$ if and only if the statistical distributions H and $H_R$ are identical; and $D(H\|H_R)\geq 0$ for all other statistical distributions H, $H_R$.

36. The method of claim 13, wherein the at least one other circumstance, in which $D(H\|H_R)\geq 0$, is a plurality of other circumstances in which the statistical distributions H and $H_R$ are not identical.

37. The method of claim 30, wherein the at least one other circumstance, in which $D(H\|H_R)\geq 0$, is a plurality of other circumstances in which the statistical distributions H and $H_R$ are not identical.

* * * * *